United States Patent
Kim et al.

(10) Patent No.: US 9,485,321 B2
(45) Date of Patent: Nov. 1, 2016

(54) METHOD AND APPARATUS FOR BROKERING SERVER AND DEVICE COMMUNICATIONS AND COMPUTER-READABLE STORAGE MEDIUM FOR EXECUTING THE METHOD

(75) Inventors: Tae-jeoung Kim, Suwon-si (KR); Man-seok Kang, Yongin-si (KR); Tae-wan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/558,865

(22) Filed: Jul. 26, 2012

(65) Prior Publication Data

US 2013/0125206 A1    May 16, 2013

(30) Foreign Application Priority Data

Nov. 11, 2011    (KR) .................. 10-2011-0117781

(51) Int. Cl.
*H04L 29/08*    (2006.01)

(52) U.S. Cl.
CPC .......... *H04L 67/2809* (2013.01); *H04L 67/26* (2013.01); *H04L 67/2823* (2013.01); *H04L 67/303* (2013.01)

(58) Field of Classification Search
CPC ..... H04L 67/2823; H04L 9/32; H04L 67/26; H04L 67/28; H04L 37/2809; H04L 67/303; H04L 67/42; H04L 45/52; G06F 15/16; G06F 30/60
USPC .................................. 726/3, 2, 12
See application file for complete search history.

(56) References Cited

U.S. PATENT DOCUMENTS

| 7,188,167 | B2* | 3/2007 | Hallin ........................... 709/223 |
| 7,257,610 | B2* | 8/2007 | Lai et al. ........................ 705/78 |
| 7,346,168 | B2* | 3/2008 | Chou et al. ................... 380/270 |
| 7,496,949 | B2* | 2/2009 | Saito ................................ 726/2 |
| 2002/0004819 | A1* | 1/2002 | Agassy et al. ................. 709/203 |
| 2003/0095540 | A1* | 5/2003 | Mulligan et al. ............. 370/352 |
| 2004/0165603 | A1* | 8/2004 | D'Angelo et al. ............ 370/401 |
| 2004/0215711 | A1* | 10/2004 | Martin et al. .................. 709/203 |
| 2005/0071674 | A1* | 3/2005 | Chou et al. .................... 713/201 |
| 2005/0143106 | A1* | 6/2005 | Chan .................. H04L 12/5895 455/466 |
| 2006/0133335 | A1* | 6/2006 | Garcia-Martin ...... H04L 12/587 370/338 |
| 2006/0171380 | A1* | 8/2006 | Chia ............................. 370/352 |

(Continued)

FOREIGN PATENT DOCUMENTS

| JP | 2010-183356 A | 8/2010 |
| KR | 10-0837434 B1 | 6/2008 |

(Continued)

*Primary Examiner* — Eric W Shepperd
(74) *Attorney, Agent, or Firm* — Sughrue Mion, PLLC

(57) ABSTRACT

A method and apparatus for brokering a communication connection between a device and a push server for providing a push service irrespective of a protocol difference between the device and the push server, and a computer readable storage medium for executing the method. The method includes: authenticating a connection between at least one device and a brokering apparatus based on protocol information relating to the at least one device; and if data is received from the server when the at least one device is connected to the brokering apparatus, modifying the data received from the server based on a protocol relating to the at least one device, and transmitting the modified data to the at least one device, wherein the brokering apparatus performs the modifying.

20 Claims, 14 Drawing Sheets

(56) References Cited

U.S. PATENT DOCUMENTS

| | | | |
|---|---|---|---|
| 2006/0230154 A1* | 10/2006 | Nguyenphu | H04L 29/06027 709/227 |
| 2006/0234743 A1* | 10/2006 | Fritsch | H04W 60/00 455/514 |
| 2009/0013087 A1* | 1/2009 | Lorch et al. | 709/232 |
| 2009/0182882 A1* | 7/2009 | Hinrichs | H04H 60/13 709/227 |
| 2009/0296657 A1* | 12/2009 | Omar et al. | 370/331 |
| 2010/0003968 A1* | 1/2010 | Cheng | 455/412.1 |
| 2010/0265866 A1* | 10/2010 | Chao et al. | 370/312 |
| 2012/0265873 A1* | 10/2012 | Iund | H04L 67/32 709/224 |
| 2012/0270579 A1* | 10/2012 | Seo et al. | 455/466 |
| 2012/0290740 A1* | 11/2012 | Tewari et al. | 709/248 |
| 2012/0311721 A1* | 12/2012 | Chen et al. | 726/27 |
| 2012/0315846 A1* | 12/2012 | Gartner et al. | 455/41.1 |

FOREIGN PATENT DOCUMENTS

| | | |
|---|---|---|
| KR | 10-0880536 B1 | 1/2009 |
| KR | 10-2010-0087274 A | 8/2010 |

* cited by examiner

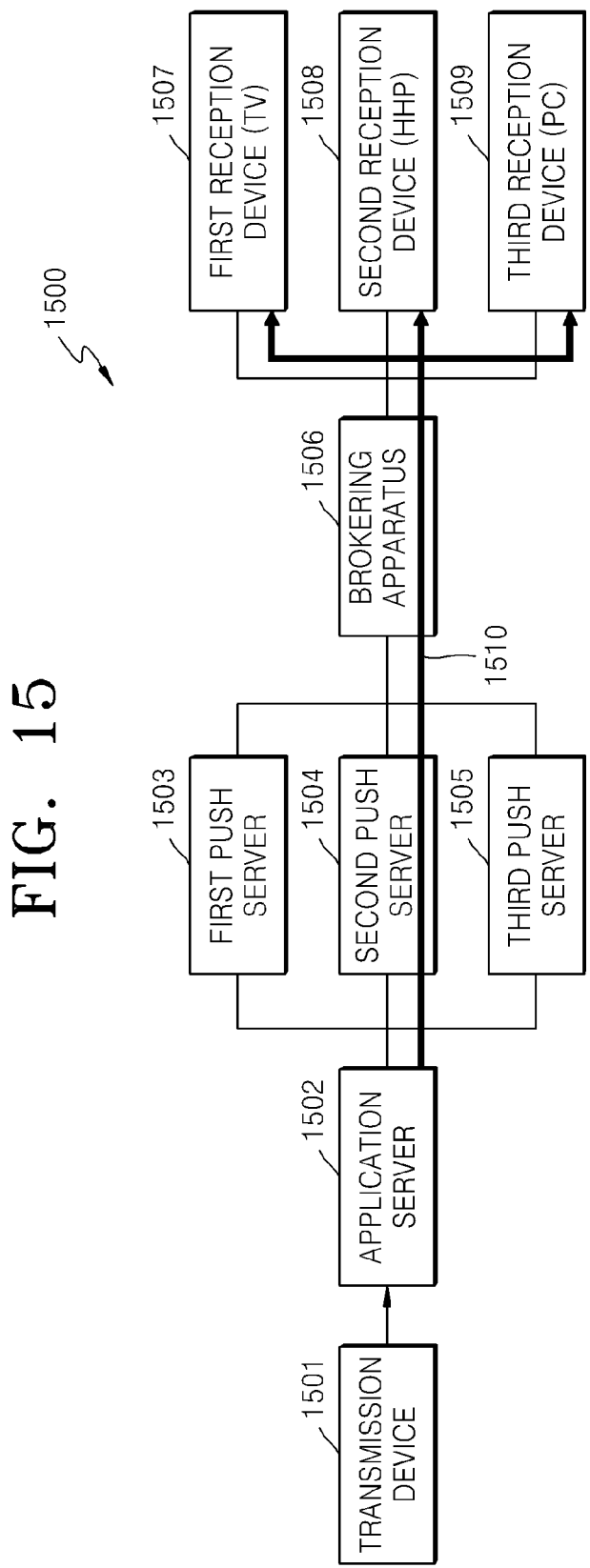

METHOD AND APPARATUS FOR BROKERING SERVER AND DEVICE COMMUNICATIONS AND COMPUTER-READABLE STORAGE MEDIUM FOR EXECUTING THE METHOD

CROSS-REFERENCE TO RELATED PATENT APPLICATION

This application claims priority from Korean Patent Application No. 10-2011-0117781, filed on Nov. 11, 2011, in the Korean Intellectual Property Office, the disclosure of which is incorporated herein by reference in its entirety.

BACKGROUND

1. Field

The present inventive concept relates to a push service, and more particularly, to brokering a communication connection between a server and a device in conjunction with using a push service.

2. Description of the Related Art

Many applications using push services have appeared since the advent of smart phones. For example, applications using push services include CNN News App, Kakao Talk Instant Messenger App, WhatsApp Messenger App, Newsticker App, and WeRule Game App.

Push services are services by which a request for information is initiated not by a user, but by a server that pushes information to the user. Typical examples of push services include news services, pointcast services, and backweb services.

In a current push service using a push server, a protocol between the push server and a device is built according to each vendor. For example, an Apple Push Notification Service (APNS) push server and an iPhone communicate by using a protocol embedded in an iOS platform which is proprietary to Apple, and a Cloud to Device Message (C2MD) push server and an Android phone communicate by using a protocol embedded in an Android platform which is proprietary to Google.

Due to such protocol differences, an iPhone cannot use the C2DM push server, and an Android phone cannot use the APNS push server. Thus, application developers are effectively required to develop separate applications which correspond to respective protocol environments.

SUMMARY

The present disclosure provides a method and apparatus for brokering a communication connection between a device and a push server to provide a push service irrespective of a protocol difference between the device and the push server, and a computer readable storage medium which stores computer-executable instructions for executing the method.

The present disclosure also provides a method and apparatus for brokering a communication connection between a device and a push server in order to provide various devices with a push service, and a computer readable storage medium which stores computer-executable instructions for executing the method.

The present disclosure also provides a method and apparatus for brokering a communication connection between a device and a push server that respectively use protocols embedded in different platforms to provide a push service therebetween, and a computer readable storage medium which stores computer-executable instructions for executing the method.

The present disclosure also provides a method and system for brokering a communication connection between a device and a push server that respectively use protocols embedded in different platforms, and for providing a push service therebetween, and a computer readable storage medium which stores computer-executable instructions for executing the method.

According to an aspect of one or more exemplary embodiments, there is provided a method of brokering a communication connection between a device and a server, the method including: authenticating a connection between at least one device and a brokering apparatus based on protocol information relating to the at least one device; and if data is received from the server when the at least one device is connected to the brokering apparatus, modifying, by the brokering apparatus, the data received from the server based on a protocol relating to the at least one device and transmitting the modified data to the at least one device.

The method may further include: receiving, by the brokering apparatus, a selection signal which indicates at least one user device of a plurality of user devices connected to the brokering apparatus from the at least one device; and setting, by the brokering apparatus, at least one target user device based on the received selection signal, wherein the modifying of the data and the transmitting of the modified data to the at least one device includes: modifying the data received from the server based on a protocol relating to the at least one target user device and transmitting the modified data to the at least one target user device.

The method may further include: registering first device identification information received from the at least one device for which the connection to the brokering apparatus is authenticated and application identification information in the brokering apparatus.

The registering of the first device identification information and the application identification information may be performed for each user, wherein the at least one user device indicated by the selection signal relates to the first device identification information and the application identification information registered in the brokering apparatus for each user.

The method may further include: if a request signal which includes second device identification information is received from the at least one device, modifying, by the brokering apparatus, the second device identification information based on a protocol relating to the server and transmitting, by the brokering apparatus, the modified data to the server; and if second device identification information allocated to the at least one device is received from the server, managing, by the brokering apparatus, the received second device identification information.

The managing of the received second device identification information may include: storing the received second device identification information in the brokering apparatus, modifying the second device identification information based on the protocol relating to the at least one device, and transmitting the modified data to the at least one device.

The managing of the received second device identification information may include: storing the received second device identification information in the brokering apparatus, and transmitting the received second device identification information to an application server relating to the application identification information.

According to another aspect of one or more exemplary embodiments, there is provided an apparatus for brokering a communication connection between a device and a server, the apparatus including: a first communication unit which communicates with at least one device; a second communication unit which communicates with the server; and a processor which authenticates a connection with the at least one device via the first communication unit based on protocol information relating to the at least one device, wherein if data is received from the server via the second communication unit when the at least one device is connected to the first communication unit, the processor modifies the data received from the server based on a protocol relating to the at least one device and transmits, via the first communication unit, the modified data to the at least one device.

If a selection signal which indicates at least one user device of a plurality of user devices connected to the first communication unit is received from the at least one device, the processor may set at least one target user device based on the received selection signal, and if the data is received from the server via the second communication unit, the processor may modify the received data based on a protocol relating to the at least one target user device and transmits the modified data to the at least one target user device via the first communication unit.

The apparatus may further include: a storage unit which stores at least one quantum of protocol information, wherein the processor registers first device identification information received from the at least one device for which the connection to the first communication unit is authenticated and application identification information, and stores the registered information in the storage unit.

The processor may register the first device identification information and the application identification information for each user, and store the registered information in the storage unit.

If a request signal which includes second device identification information is received from the at least one device, the processor may modify the received second device identification information based on a protocol relating to the server and transmit the modified data to the server via the second communication unit; and if second device identification information is received from the server via the second communication unit, the processor may manage the received second device identification information.

The processor may manage the received second device identification information by storing the received second device identification information in the storage unit, modifying the second device identification information based on the protocol relating to the at least one device, and transmitting the modified data to the at least one device via the first communication unit.

The apparatus may further include: a third communication unit which communicates with an application server, wherein the processor manages the received second device identification information by storing the received second device identification information in the storage unit, and transmitting the received second device identification information to the application server via the third communication unit.

The apparatus may be embedded in the server, and the second communication unit may be configured as an interface for transmitting and receiving data between the server and the apparatus.

According to another aspect of one or more exemplary embodiments, there is provided a push service system including: at least one device which receives push data; an application server which provides the push data based on at least one application; a push server which transmits the push data provided from the application server to the at least one device based on identification information allocated to the at least one device; and a brokering apparatus which brokers a communication connection between the at least one device and the push server such that the push data is transmitted from the push server to the at least one device irrespective of a protocol difference between the at least one device and the push server.

The brokering apparatus may modify the push data based on a protocol relating to the at least one device.

BRIEF DESCRIPTION OF THE DRAWINGS

The above and other features and advantages of the present inventive concept will become more apparent by describing in detail exemplary embodiments thereof with reference to the attached drawings in which:

FIG. 15 is a block diagram which illustrates a flow of push data when a push service is provided by using a brokering apparatus as used in one or more exemplary embodiments.

DETAILED DESCRIPTION

Figure 1:
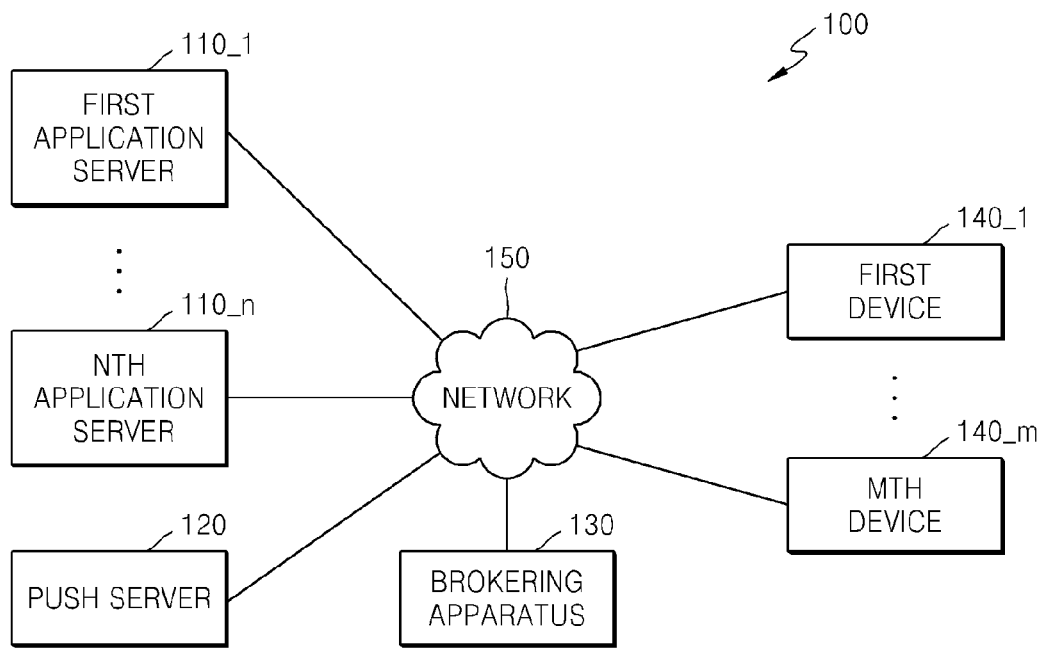
FIG. 1 is a block diagram of a push service system including a brokering apparatus according to an exemplary embodiment.

The attached drawings, which illustrate exemplary embodiments, are referred to in order to gain a sufficient understanding of the present inventive concept, the merits thereof, and the objectives accomplished by the implementation thereof.

The present inventive concept will now be described more fully with reference to the accompanying drawings, in which exemplary embodiments are shown. Like reference numerals denote like elements throughout.

As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram of a push service system 100, including a brokering apparatus 130, according to an exemplary embodiment.

Referring to FIG. 1, the push service system 100 includes first through nth application servers 110_1~110_n, a push server 120, the brokering apparatus 130, first through mth devices 140_1~140_m, and a network 150.

The push service system 100 of FIG. 1 is an example in which the brokering apparatus 130 routes each of the one push server 120 and the plural first through mth devices 140_1~140_m in order to provide a push service, irrespective of a protocol difference between the one push server 120 and any one of the plural first through mth devices 140_1~140_m.

Each of the first through nth application servers 110_1~110_n of FIG. 1 provides the push server 120 with push data relating to different respective applications over the network 150. The push data includes notification data. When the push data is provided to the push server 120, each of the first through nth application servers 110_1~110_n transfers the push data based on a protocol relating to the push server 120. For example, when the push server 120 is an Apple Push Notification Service (APNS) push server, each of the first through nth application servers 110_1~110_n provides the push server 120 with the push data based on a protocol embedded in an iOS platform. When the push server 120 is a Cloud to Device Message (C2MD) push server, each of the first through nth application servers 110_1~110_n provides the push server 120 with the push data based on a protocol embedded in an Android platform. When the push server 120 operates based on a protocol embedded in a BADA platform, each of the first through nth application servers 110_1~110_n provides the push server 120 with the push data based on the protocol embedded in the BADA platform.

Each of the first through nth application servers 110_1~110_n may host providers for providing push data based on one or more applications, such as, for example, CNN News App, Kakao Talk Instant Messenger App, WhatsApp Messenger App, Newsticker App, and/or WeRule Game App, but the present disclosure is not limited thereto. The first through nth application servers 110_1~110_n may be referred to as content servers.

The push server 120 transmits the push data to a destination device over the network 150, wherein the destination device is indicated by second service identification information included in the push data received from the first through nth application servers 110_1~110_n. The destination device includes at least one device of the first through mth devices 140_1~140_m. However, in the present exemplary embodiment, the brokering apparatus 130 intercepts the push data being transmitted to the destination device from the push server 120. The second service identification information may include, for example, device identification information allocated to the first through mth devices 140_1~140_m by the push server 120 for a push service, and may be defined as a token value. The second service identification information may be allocated to respective users one by one. For example, if the first, second, and third devices 140_1~140_3 have a user A, the same second device identification information is allocated to each of the first, second, and third devices 140_1~140_3.

The push server 120 may determine whether the destination device is connected to the brokering apparatus 130 when transmitting the push data by sending a query regarding a connection status of the destination device to the brokering apparatus 130 and receiving a response or an acknowledgement message from the brokering apparatus 130. If it is determined that the destination device is not connected to the brokering apparatus 130, the push server 120 may store the push data in a database. If it is determined that the destination device is connected to the brokering apparatus 130, the push server 120 may transmit the push data stored in the database to the destination device through the brokering apparatus 130. In this regard, the connection status of the destination device may be determined according to a power-on status or a power-off status of the destination device, or according to an on status or an off status of wireless fidelity (WiFi) and 3G communication. The database may be embedded in the push server 120, or may be installed outside the push server 120.

The brokering apparatus 130 intercepts the push data transmitted from the push server 120 to the first through mth devices 140_1~140_m over the network 150 using the second device identification information. The brokering apparatus 130 may determine whether protocols respectively relating to the push server 120 and the destination device differ based on the second device identification information, which relates to the destination device and is included in the received push data and protocol information relating to the push server 120. If it is determined that respective protocols relating to the push server 120 and the destination device do not differ, the brokering apparatus 130 transmits the received push data to the destination device over the network 150.

However, if it is determined that protocols respectively relating to the push server 120 and the destination device differ, the brokering apparatus 130 modifies the push data received from the push server 120 based on the protocol relating to the destination device, and transmits the modified data to the destination device over the network 150. Thus, the brokering apparatus 130 may be referred to a protocol broker. An operation performed by the brokering apparatus 130 acting as the protocol broker will be described in more detail with reference to FIGS. 2-7 and 11.

The first through mth devices 140_1~140_m, which are devices having a communication function over the network 150, include devices which are capable of communication using protocols embedded in different platforms and/or devices which are capable of communication using a protocol embedded in the same platform. For example, the first through mth devices 140_1~140_m may include televisions, portable apparatuses, personal computers (PCs), and notebooks. Portable apparatuses may include electronic picture frames, cellular phones, navigation devices, tablets, set-tops, and personal digital assistants (PDAs). The first through mth devices 140_1~140_m may include a plurality of devices used by a user. If the first through mth devices 140_1~140_m include a plurality of devices used by a user A, the plurality of devices may include devices capable of communication located in a home of the user A. The plurality of devices used by the user A may include devices capable of communication using protocols embedded in different platforms and/or devices capable of communication using a protocol embedded in the same platform.

When the set of first through mth devices 140_1~140_m includes the plurality of devices used by the user A, the brokering apparatus 130 may transmit the push data to one particular device selected by the user A from among the plurality of devices. If the brokering apparatus 130 includes a function of transmitting the push data to the device selected by the user A, the brokering apparatus 130 may be a push server broker. An operation performed by the brokering apparatus 130 acting as the push server broker will be described in more detail with reference to FIGS. 2-11.

The network 150 may include, for example, a first network (not shown) capable of wired communication between each of the first through nth application servers 110_1~110_n and the push server 120, a second network (not shown) capable of wired communication between the push server 120 and the brokering apparatus 130, and a third network (not shown) capable of wired or wireless communication between the brokering apparatus 130 and each of the first through mth devices 140_1~140_m. The first and second networks may use, for example, a local area network (LAN), but the present disclosure is not limited thereto. The third network may use, for example, WiFi, 3G, and LAN, but the present disclosure is not limited thereto.

Figure 2:
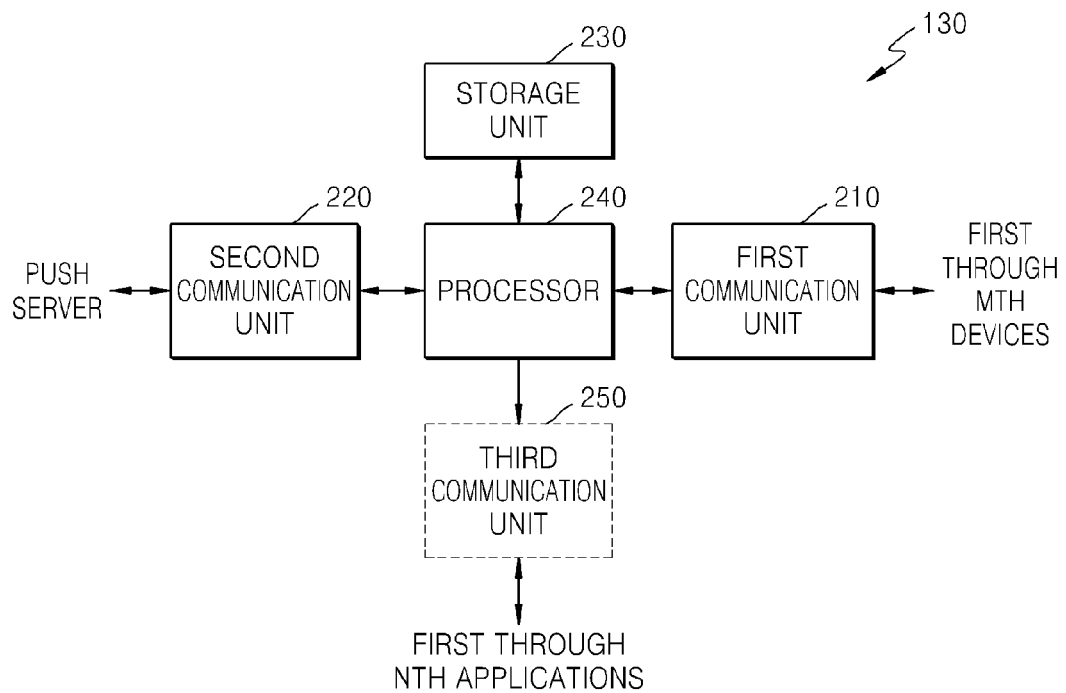
FIG. 2 is a functional block diagram of the brokering apparatus of FIG. 1.

FIG. 2 is a functional block diagram of the brokering apparatus 130 of FIG. 1. Referring to FIG. 2, the brokering apparatus 130 includes a first communication unit 210, a second communication unit 220, a storage unit 230, a processor 240, and a third communication unit 250. The brokering apparatus 130 may not include the third communication unit 250 when second device identification information allocated to the first through mth devices 140_1~140_m by the push server 120 is transmitted to each of the first through nth application servers 110_1~110_n, and when each of the first through mth devices 140_1~140_m directly transmits messages to one or more of the first through nth application servers 110_1~110_n without using the brokering apparatus 130.

The first communication unit 210 facilitates communication between each of the first through mth devices 140_1~140_m and the processor 240 over the network 150. The second communication unit 220 facilitates communication between the push server 120 and the processor 240 over the network 150. The third communication unit 250 facilitates communication between each of the first through nth application servers 110_1~110_n and the processor 240 over the network 150.

The storage unit 230 stores a program for executing a method for brokering a communication connection between a device and a push server or a push service method, and data necessary for performing the method according to one exemplary embodiment. The data necessary for performing the method may include protocol information supported by the brokering apparatus 130 as listed in Table 1 below, command map information relating to protocols as listed in Table 2 below, or command set information and protocol information relating to the push server 120.

TABLE 1

| Port | Protocol |
|---|---|
| x1 | HTTP |
| x2 | WS (Web Socket) |
| x3 | APNS |

TABLE 1-continued

| Port | Protocol |
|---|---|
| x4 | C2DM |
| x5 | BADA |

TABLE 2

| Protocol | Command set |
|---|---|
| HTTP | GET, PUT, . . . |
| WS | GET, PUT, . . . |
| APNS | alert, badge, sound, body, . . . |
| C2DM | sender, c2dmsharp, registration_id, . . . |
| BADA | message, badge, action, encodeType, |

The processor 240 loads the program for executing the method for brokering a communication connection between the device and the push server according to one exemplary embodiment which is stored in the storage unit 230, and brokers a communication connection between at least one of the first through mth devices 140_1~140_m and the push server 120 when the push service method is performed.

Figure 3:
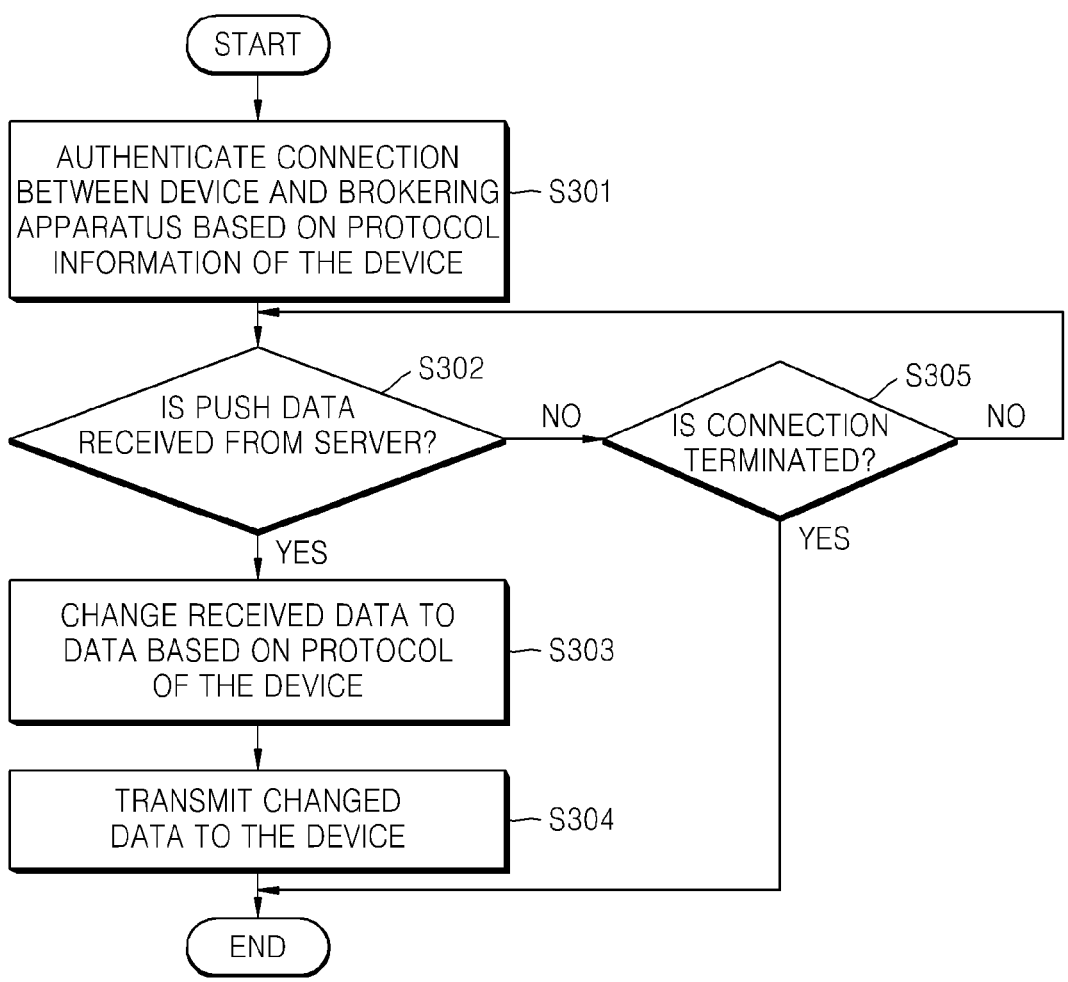
FIG. 3 is a flowchart illustrating a method for brokering a communication connection between a device and a push server according to an exemplary embodiment.

In particular, the processor 240 of FIG. 2 may operate as illustrated in a flowchart shown in FIG. 3. FIG. 3 is a flowchart illustrating a method for brokering a communication connection between a device and the push server 120 according to an exemplary embodiment.

Referring to FIG. 3, the processor 240 authenticates a connection between at least one device of the first through mth devices 140_1~140_m and the brokering apparatus 130 based on protocol information relating to the at least one device (operation S301).

Figure 4:
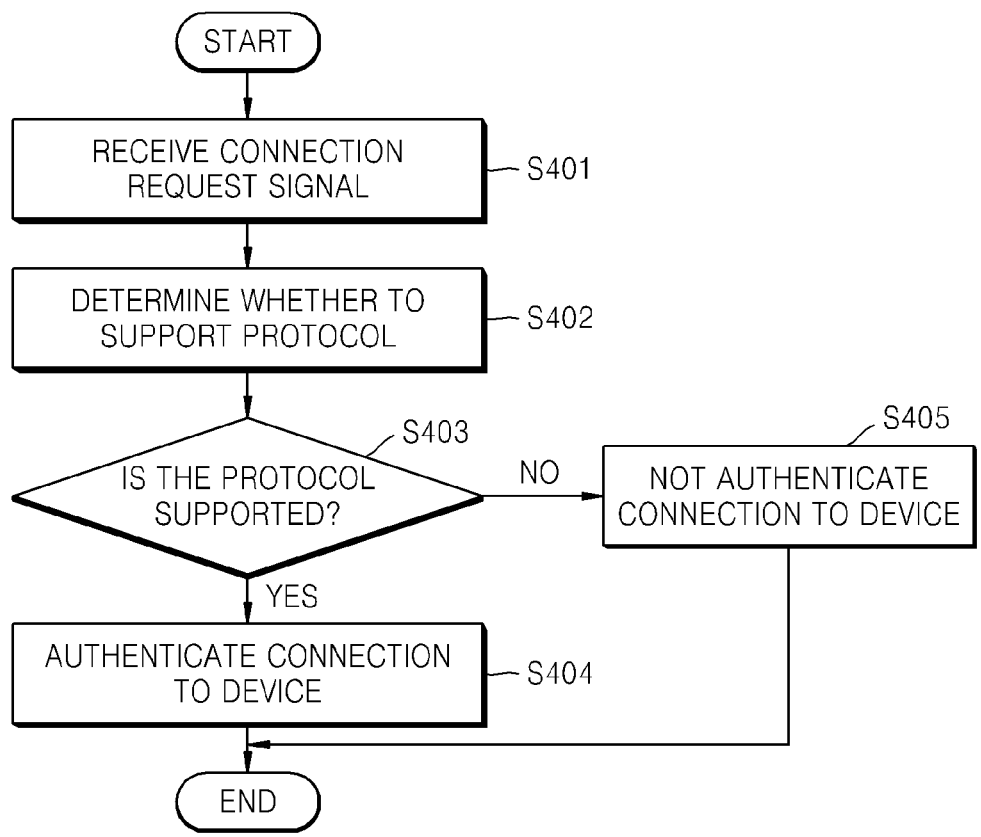
FIG. 4 is a flowchart illustrating a process for authenticating a connection between a device and a brokering apparatus in a method for brokering a communication connection between a device and a push server according to an exemplary embodiment.

A process for authenticating the connection between the at least one device and the brokering apparatus 130 is performed as indicated in a flowchart shown in FIG. 4. FIG. 4 is a flowchart illustrating a process for authenticating a connection between a device and the brokering apparatus 130 in a method for brokering a communication connection between a device and the push server 120 according to an exemplary embodiment.

Referring to FIG. 4, if the processor 240 receives a connection request signal from at least one device of the first through mth devices 140_1~140_m via the first communication unit 210 (operation S401), the processor 240 determines whether the brokering apparatus 130 supports a protocol relating to the at least one device by using protocol information based on port information included in the received connection request signal and port information stored in the storage unit 230 and listed in Table 1 above (operation S402).

If the protocol information based on the ports listed in Table 1 above is stored in the storage unit 230 and the port information included in the received connection request signal corresponds to one of x1~x5, the processor 240 determines that the brokering apparatus 130 supports the protocol of the at least one device and transmits a connection authentication message to the at least one device from which the connection request signal was received via the first communication unit 210 (operations S403 and S404).

However, if the port information included in the received connection request signal does not correspond to one of x1~x5, the processor 240 determines that the brokering apparatus 130 does not support the protocol of the at least one device, and transmits a connection non-authentication message to the at least one device from which the connection request signal was received via the first communication unit 210 (operations S403 and S405). In operation S405, the processor 240 may transmit an error message to the at least one device from which the connection request signal was received via the first communication unit 210.

Meanwhile, in operation S302 of FIG. 3, if the processor 240 receives push data from the push server 120, the processor 240 changes, or modifies, the received push data based on protocol information relating to the at least one device (operation S303). To this end, the processor 240 determines a protocol of a destination device by using second device identification information relating to the destination device included in the received push data, by using information stored in the storage unit 230. In particular, the storage unit 230 stores mapping information for use in conjunction with the second device identification information and the protocol information relating to the at least one device before the processor 240 receives the push data. The processor 240 changes, or modifies, the received push data based on the determined protocol of the destination device. The processor 240 transmits the modified data to the destination device via the first communication unit 210 (operation S304).

In operation S302 of FIG. 3, if the processor 240 does not receive the push data from the push server 120, the processor 240 determines whether the communication connection between the destination device and the brokering apparatus 130 has terminated (operation S305). The connection may terminate when the destination device is powered off, or when a connection medium such as 3G or WiFi is turned off. Thus, the processor 240 determines that the connection between the destination device and the brokering apparatus 130 has terminated when the destination device is powered off or when the connection medium such as 3G or WiFi is turned off and thus no signal is transmitted to the brokering apparatus 120. If processor 240 determines that the connection between the destination device and the brokering apparatus 130 has terminated, the processor 240 may stop brokering the communication connection between the at least one device of the first through mth devices 140_1~140_m and the brokering apparatus 130. However, if the processor 240 determines that the connection between the destination device and the brokering apparatus 130 has not terminated, the processor 240 may maintain a standby to receive the push data.

Figure 5:
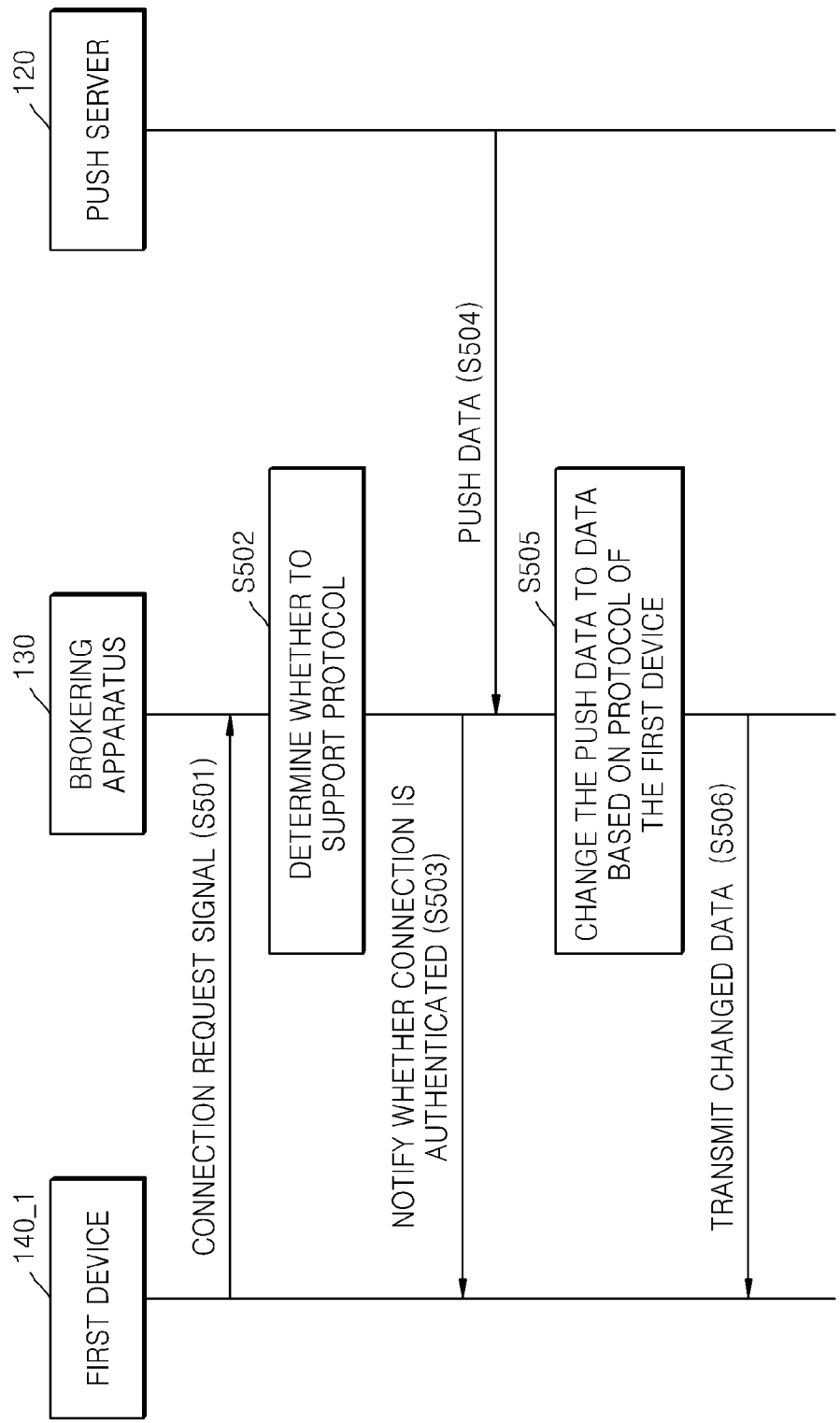
FIG. 5 is a flowchart illustrating operations between a first device, the brokering apparatus, and a push server of FIG. 1 based on the flowcharts of FIGS. 3 and 4.

FIG. 5 is a flowchart illustrating operations between the first device 140_1, the brokering apparatus 130, and the push server 120 of FIG. 1 based on the flowcharts of FIGS. 3 and 4.

Referring to FIG. 5, if the first device 140_1 transmits a connection request signal to the brokering apparatus 130 over the network 150 (operation S501), the brokering apparatus 130 determines whether to support a protocol of the first device 140_1 based on port information included in the received connection request signal as described in operation S402 of FIG. 4 (operation S502). The connection request signal may include the port information and server Internet protocol (IP) information. The server IP information is IP information relating to the brokering apparatus 130.

The brokering apparatus 130 transmits a notification of whether to authenticate the connection to the first device 140_1 based on a result of the determination in operation S502 (operation S503). The notification of whether to authenticate the connection includes one of a connection authentication notification and a connection non-authentication notification. In particular, as described with reference to FIG. 4, if the brokering apparatus 130 determines that the protocol of the first device 140_1 is supported, the brokering apparatus 130 transmits the connection authentication notification to the first device 140_1. Conversely, if the brokering apparatus 130 determines that the protocol of the first device 140_1 is not supported, the brokering apparatus 130 transmits the connection non-authentication notification to the first device 140_1.

If the brokering apparatus 130 receives push data from the push server 120 when the brokering apparatus 130 and the first device 140_1 are connected to each other (operation S504), the brokering apparatus 130 changes, or modifies, the received push data based on the protocol of the first device 140_1 as described in operation S303 of FIG. 3 (operation S505). The brokering apparatus 130 transmits the changed, or modified, push data to the first device 140_1 (operation S506).

Figure 6:
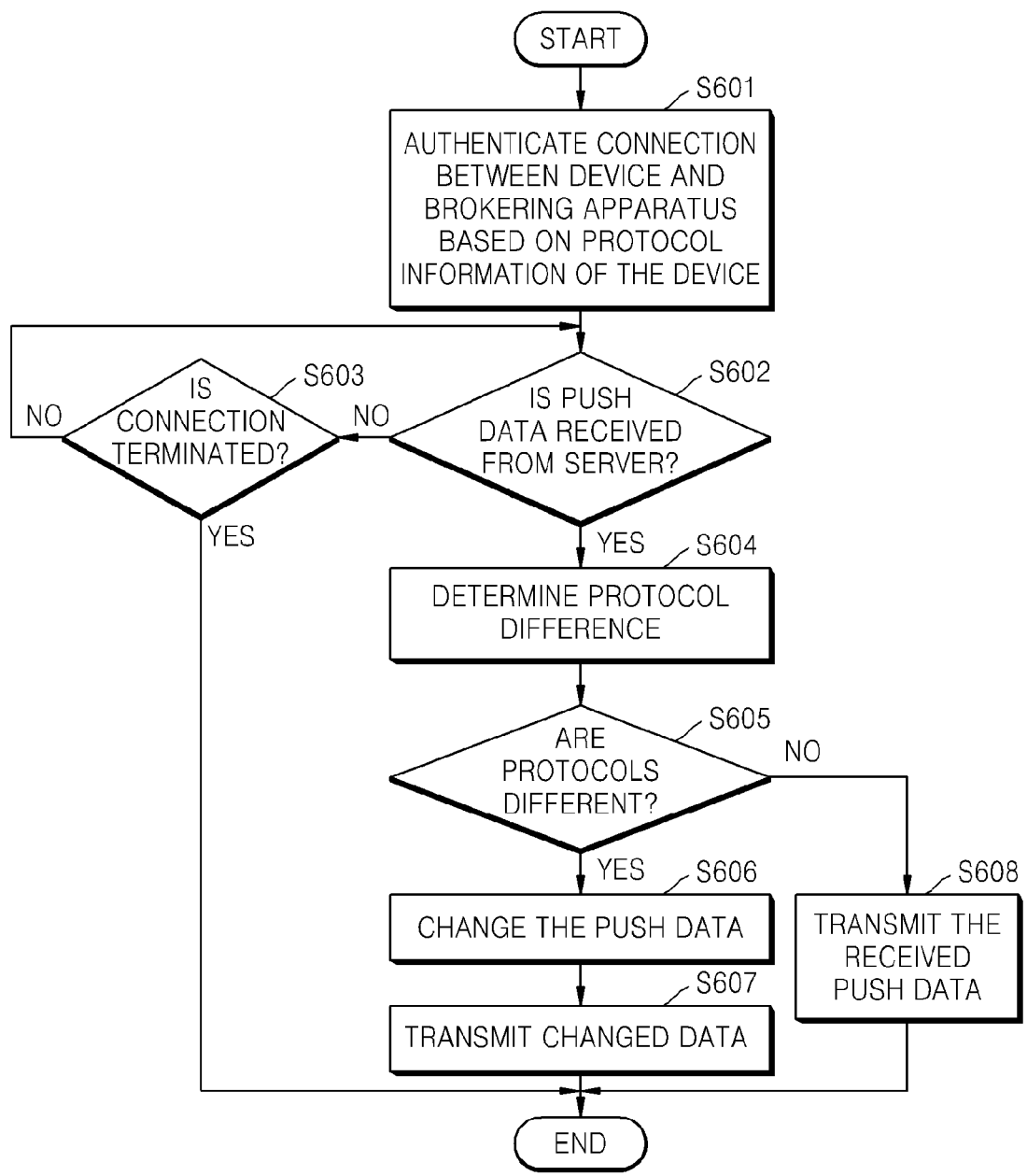
FIG. 6 is a flowchart illustrating a method for brokering a communication connection between a device and a push server according to another exemplary embodiment.

The processor 240 of FIG. 2 may operate as illustrated in a flowchart shown in FIG. 6. FIG. 6 is a flowchart illustrating a method for brokering a communication connection between a device and the push server 120 according to another exemplary embodiment. The flowchart of FIG. 6 further includes an operation of determining a protocol difference between the push server 120 and a destination device when push data is received, by contrast with the flowchart of FIG. 3. Operations S601, S602, and S603 of FIG. 6 are respectively similar to corresponding operations S301, S302, and S305 of FIG. 3, and thus descriptions thereof will be omitted here.

Referring to FIG. 6, in operation S604, the processor 240 determines whether respective protocols of the push server 10 and the destination device differ, by comparing protocol information relating to the destination device and protocol information relating to the push server 120 that are stored in the storage unit 230. To this end, the storage unit 230 may store the protocol information relating to the destination device and the protocol information relating to the push server 120 in advance.

If the processor 240 determines that the respective protocols of the push server 10 and the destination device differ, the processor 240 modifies the received push data based on the protocol of the destination device (operations S605 and S606), and transmits the modified data to the destination device via the first communication unit 210 (operation S607).

If the processor 240 determines that the respective protocols of the push server 10 and the destination device do not differ, the processor 240 does not modify the received push data, and transmits the received push data to the destination device via the first communication unit 210 (operations S605 and S608).

Figure 7:
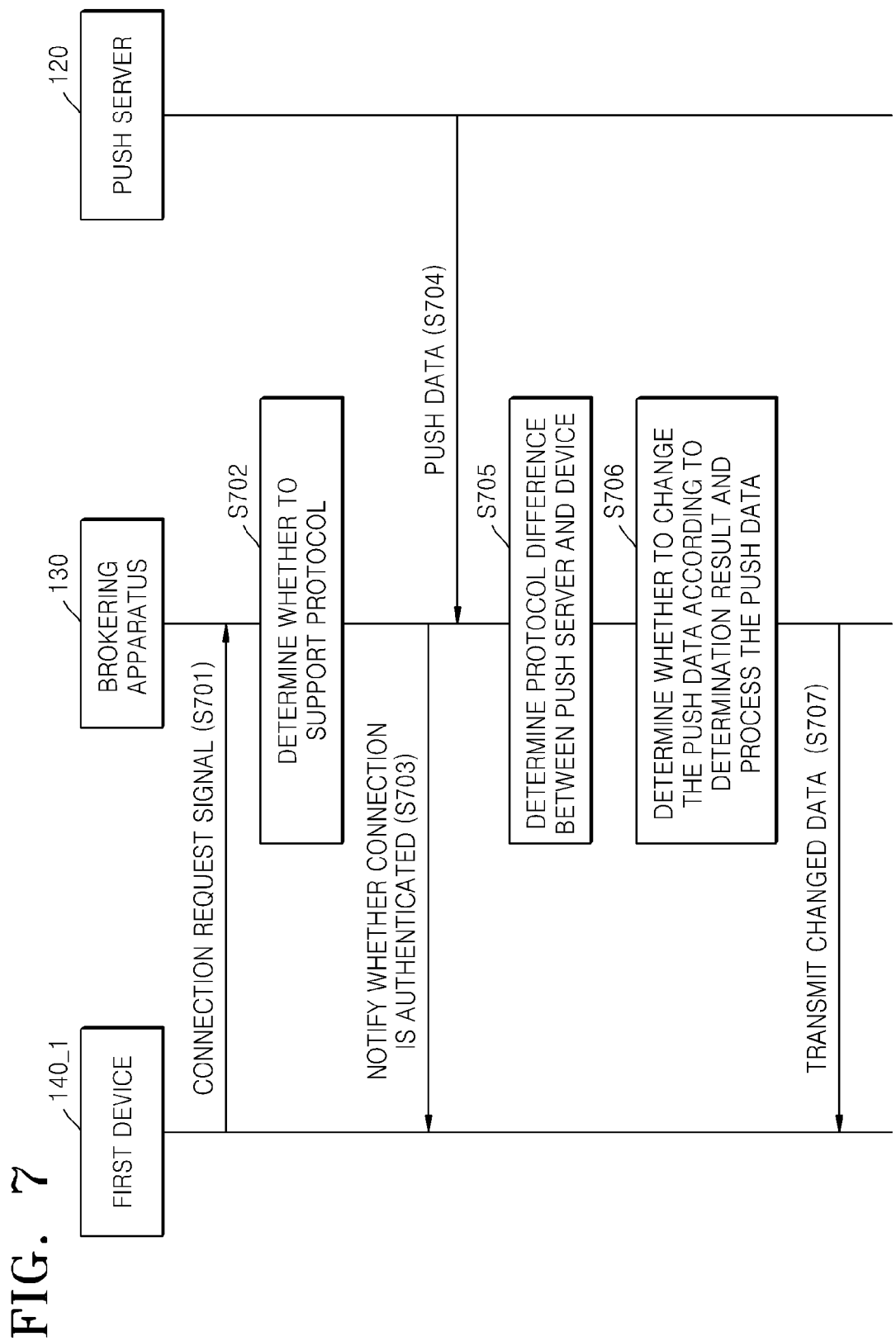
FIG. 7 is a flowchart illustrating operations between a first device, the brokering apparatus, and a push server of FIG. 1 based on the flowchart of FIG. 6.

FIG. 7 is a flowchart illustrating operations between the first device 140_1, the brokering apparatus 130, and the push server 120 of FIG. 1 based on the flowchart of FIG. 6. Operations S701, S702, S703, and S704 of FIG. 7 are respectively similar to corresponding operations S501, S502, S503, and S504 of FIG. 5, and thus descriptions thereof will be omitted here.

Referring to FIG. 7, if push data is received from the push server 120 (operation S704), the brokering apparatus 130 determines whether respective protocols of the push server 120 and the first device 140_1 differ (operation S705), as described in operation S604 of FIG. 6. If the brokering apparatus 130 determines that the respective protocols of the push server 120 and the first device 140_1 differ, the brokering apparatus 130 modifies the received push data based on the protocol of the first device 140_1, and transmits the modified data to the first device 140_1 (operations S706 and S707). If the brokering apparatus 130 determines that the respective protocols of the push server 120 and the first device 140_1 do not differ, the brokering apparatus 130 does not modify the received push data, and transmits the received push data to the first device 140_1 (operations S706 and S707).

Figure 8:
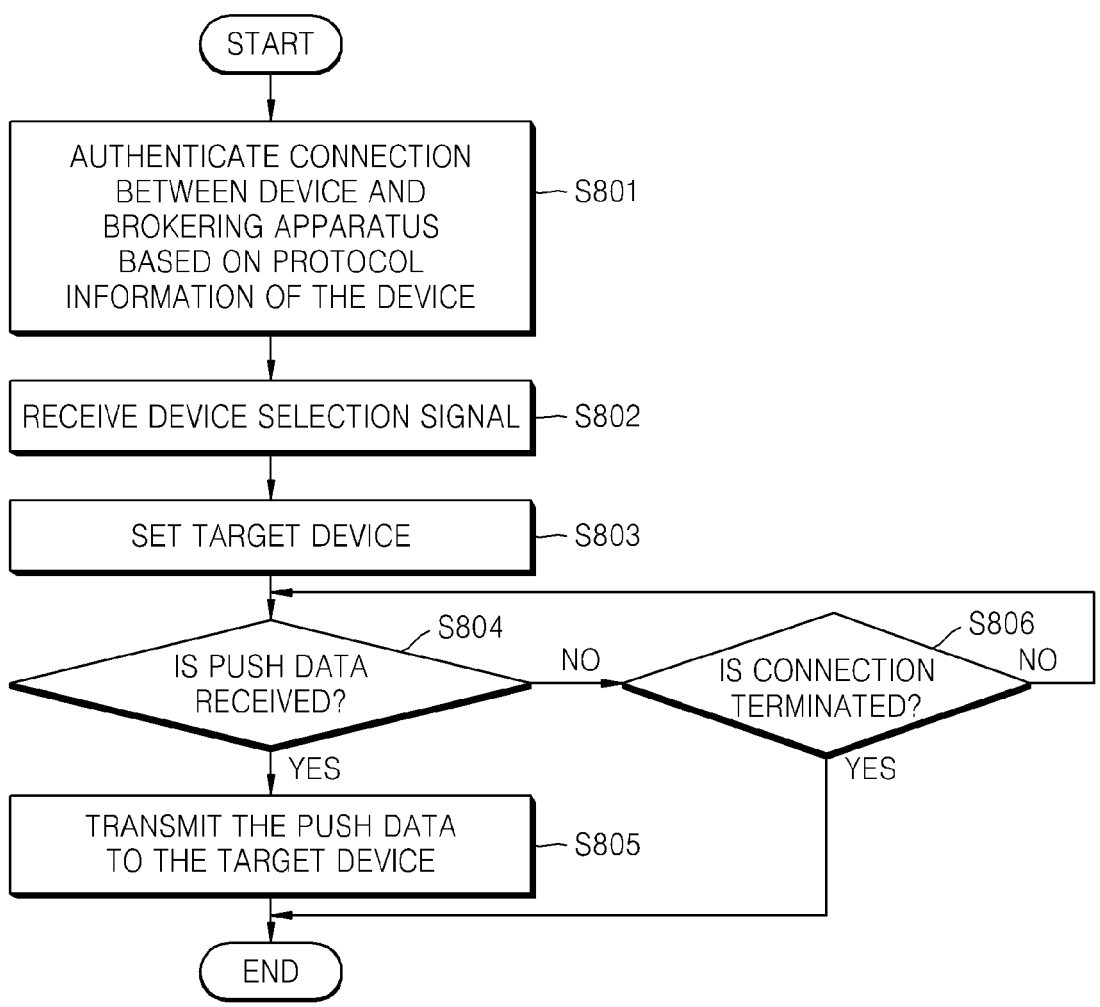
FIG. 8 is a flowchart illustrating a method for brokering a communication connection between a device and a push server according to another exemplary embodiment.

The processor 240 of FIG. 2 may operate as shown in a flowchart of FIG. 8. FIG. 8 is a flowchart illustrating a method for brokering a communication connection between a device and the push server 120, according to another exemplary embodiment. The flowchart of FIG. 8 shows the method for brokering a communication connection between the device and the push server 120 to provide push data by using one device selected by a user A from among a plurality of devices which are available for use by the user A and are connected to the brokering apparatus 130 as a destination target device (hereinafter referred to as a "target device" or a "target user device"). Operation S801 is similar to operation S301 of FIG. 3, and thus a description thereof will be omitted here.

In operation S802, if the processor 240 receives a device selection signal from at least one of the plurality of devices which are available for use by the user A and are connected to the brokering apparatus 130, the processor 240 sets the target device to which the push data is to be transmitted based on the received device selection signal (operations S802 and S803). For example, if the first, second, and third devices 140_1~140_3 currently connected to the brokering apparatus 130 are the plurality of devices which are available for use by the user A, and the processor 240 receives a selection signal which indicates the second device 140_2 from the first device 140_1, the processor 240 sets the second device 140_2 as the target device. The selection signal may be transmitted based on device information stored in the first device 140_1. The device information stored in the first device 140_1 may include information relating to a list of the plurality of devices which are available for use by the user A and which are connected to the brokering apparatus 130.

If the processor 240 receives push data from the push server 120 via the second communication unit 220 (operation S804), the processor 240 analyzes second device identification information included in the received push data. If the processor 240 analyzes that the received push data is to be transmitted to the user A, the processor 240 transmits the push data to the target device set in operation S803 (operation S805). In this regard, if respective protocols of the target device and the push server 120 differ, the processor 240 modifies the push data based on the protocol of the target device, and transmits the modified data to the target device. Meanwhile, if the processor 240 does not receive the push data, the processor 240 performs operation S806 similarly as described above with respect to operation S305 of FIG. 3.

Figure 9:
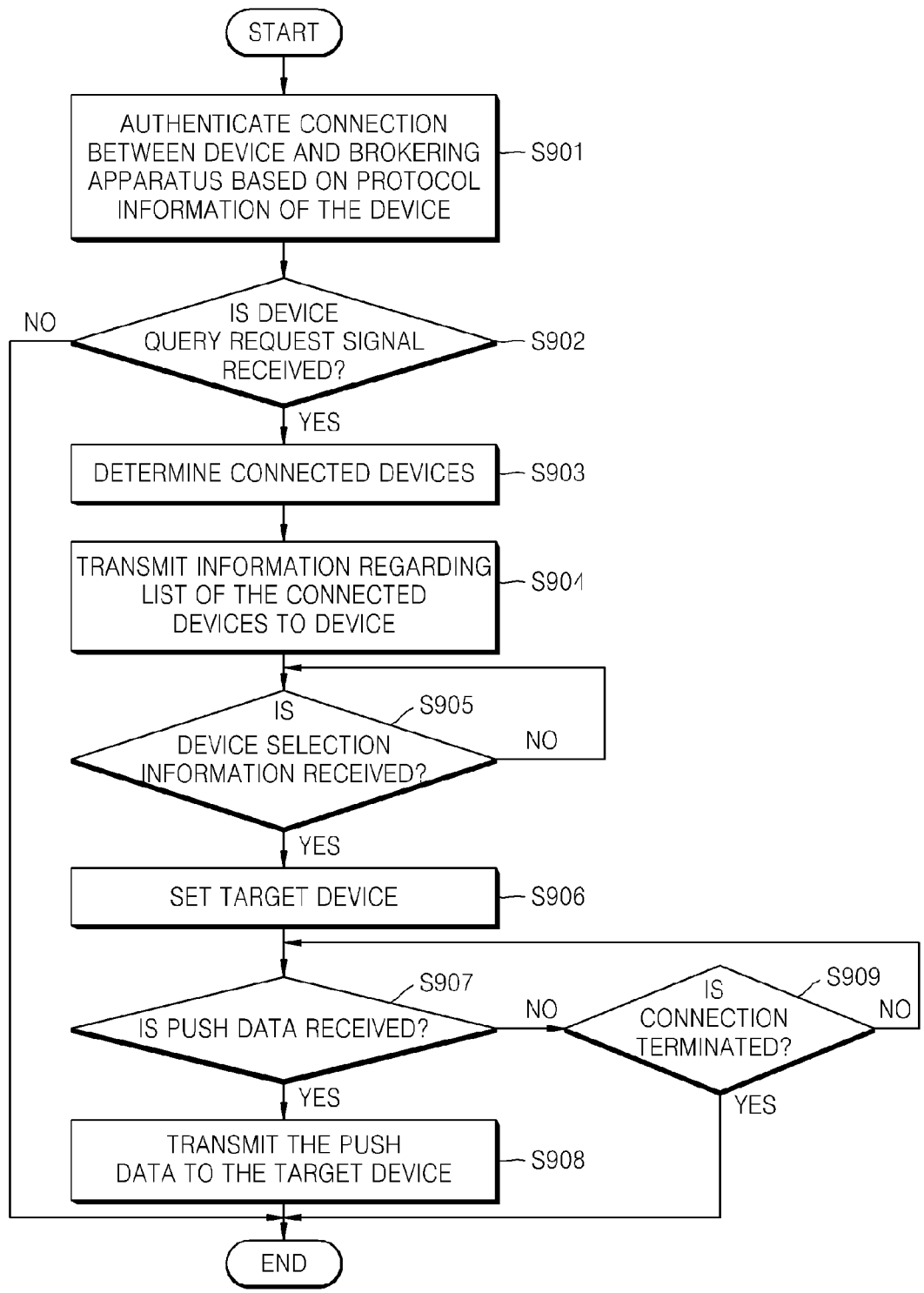
FIG. 9 is a flowchart illustrating a method for brokering a communication connection between a device and a push server according to another exemplary embodiment.

The processor 240 of FIG. 2 may operate as illustrated in a flowchart shown in FIG. 9. FIG. 9 is a flowchart illustrating a method for brokering a communication connection between a device and the push server 120, according to another exemplary embodiment. In FIG. 9, a device selection signal is based on a list of devices stored in the brokering apparatus 130. Operations S901, S907, S908, and S909 are respectively similar to corresponding operations S801, S804, S805, and S806 of FIG. 8, and thus descriptions thereof will be omitted here.

Referring to FIG. 9, in operation S902, if the processor 240 receives a device query request signal from at least one of a plurality of devices which are available for use by a user A via the first communication unit 210, the processor 240 searches for user information stored in the storage unit 230 and determines the plurality of devices available for use by the user A which are currently connected to the brokering apparatus 130 (operation S903). The storage unit 230 may store the user information as listed in Table 3 below by using first device identification information relating to a device for which a connection to the brokering apparatus 130 is authenticated and application identification information. The first device identification information is allocated to each device when devices are manufactured.

TABLE 3

| User Information | First Device Identification Information | Device Type | Protocol Type | Application Identification Information | Connection Status |
|---|---|---|---|---|---|
| User A | aghkasd | TV | HTTP | kakao, news | on |
| User A | 12341 | set-top | FTP | kakao | on |
| User A | kgjakg | Cellular phone | C2DM | kakao, news | on |
| User A | rhhhpa1 | Computer | HTTP | news | on |
| User B | q2tqo | Cellular phone | APNS | kakao, news | on |
| User B | sdghka | TV | HTTP | kakao, news | off |

The processor 240 transmits, via the first communication unit 210, information relating to a list of the plurality of devices available for use by the user A which are connected to the brokering apparatus 130 to the device from which the device query request signal was received based on the determination result (operation S904). If the user information as listed in Table 3 above is stored in the storage unit 230, and the device from which the device query request signal was received is a TV available for use by the user A, the processor 240 transmits information regarding four devices (a TV, a set-top, a cellular phone, and a computer) relating to the user A to the TV relating to the user A.

If the processor 240 receives a device selection signal based on the transmitted information (operation S905), the processor 240 sets a target device based on the received device selection signal (operation S906). The received device selection signal may be a signal which includes information relating to selecting one device, a signal which includes information relating to selecting a plurality of devices, or a signal which includes information relating to selecting all devices.

FIGS. 8 and 9 are examples which include a function of selecting a target device that is to receive push data when a plurality of devices available for use by a user is connected to the brokering apparatus 130. However, when the plurality of devices relating to the user is connected to the brokering apparatus 130, if the target device is not selected, the processor 240 may be configured to transmit the push data to all of the plurality of devices connected to the brokering apparatus 130, or to a particular device which has been set as a default.

Figure 10:
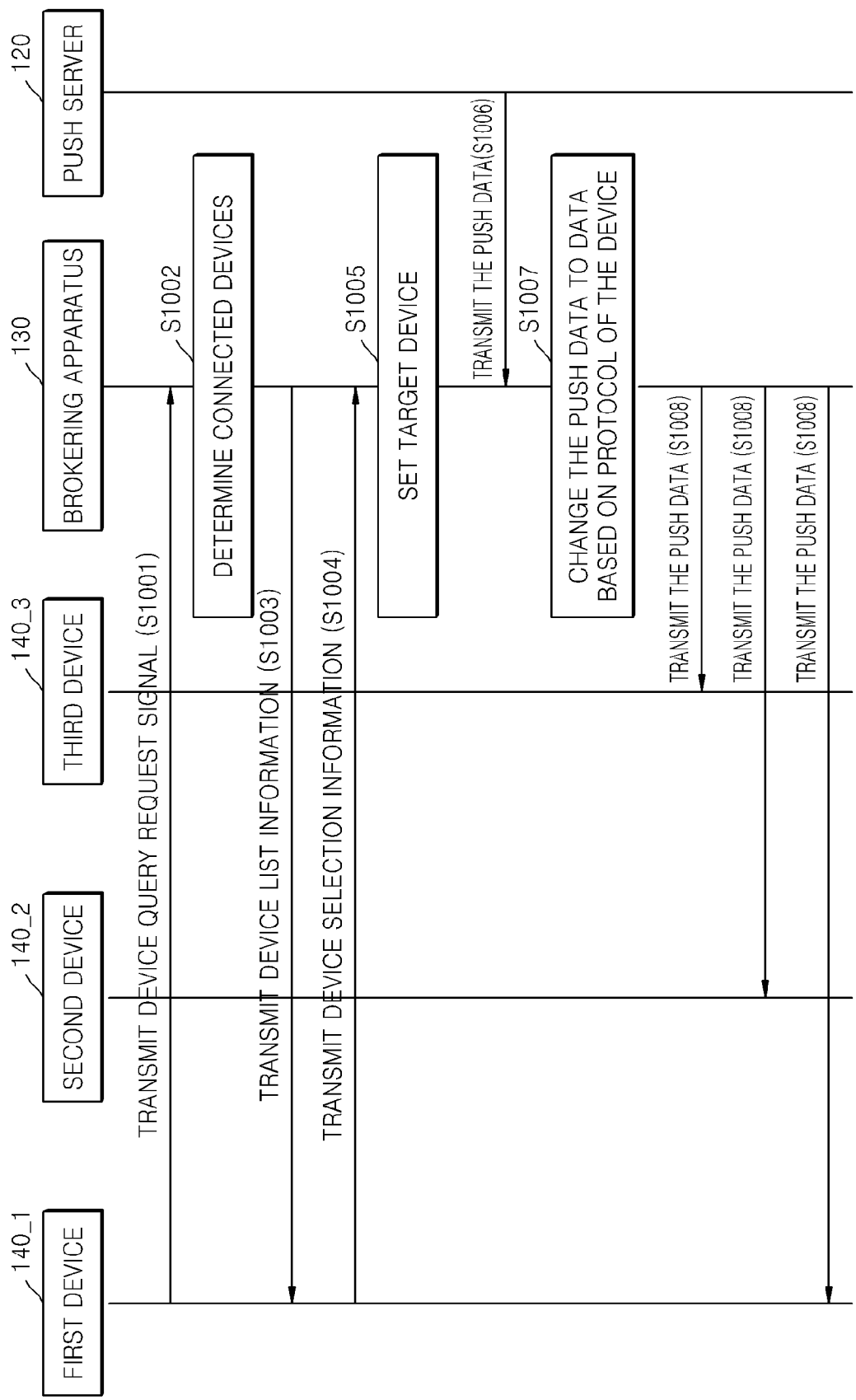
FIG. 10 is a flowchart illustrating operations between first, second, and third devices, the brokering apparatus, and a push server of FIG. 1 based on the flowchart of FIG. 9.

FIG. 10 is a flowchart illustrating operations between the first, second, and third devices 140_1~140_3, the brokering apparatus 130, and the push server 120 of FIG. 1 based on the flowchart of FIG. 9. In FIG. 10, the first, second, and third devices 140_1~140_3 available for use by a user A are connected to the brokering apparatus 130 and are set as target devices.

Referring to FIG. 10, if the brokering apparatus 130 receives a device query request signal from the first device 140_1 (operation S1001), the brokering apparatus 130 determines devices relating to a user A currently connected thereto based on user information stored in the storage unit 230 (operation S1002). The brokering apparatus 130 transmits information relating to a list of the devices relating to the user A currently connected thereto to the first device 140_1 based on the determination result (operation S1003). The information relating to the list of the devices available for use by the user A may be based on Table 3 above.

Thus, if the brokering apparatus 130 receives a signal which includes device selection information from the first device 140_1, and the received device selection information indicates a selection of all of the first, second, and third devices 140_1~140_3 (operation S1004), the brokering apparatus 130 sets the first, second, and third devices 140_1~140_3 as target devices to which push data is to be transmitted (operation S1005).

If the brokering apparatus 130 receives the push data from the push server 120 (operation S1006), and the received push data is second device identification information (or token information) allocated to the user A, the brokering apparatus 130 modifies the push data based on respective protocols relating to each of the first, second, and third devices 140_1~140_3, and transmits the modified data to each respective one of the first, second, and third devices 140_1~140_3 (operations S1007 and S1008).

When the second device 140_2 is set as the target device, if the brokering apparatus 130 receives push data relating to the user A from the push server 120, the brokering apparatus 130 transmits the received push data to the second device 140_2.

Figure 11:
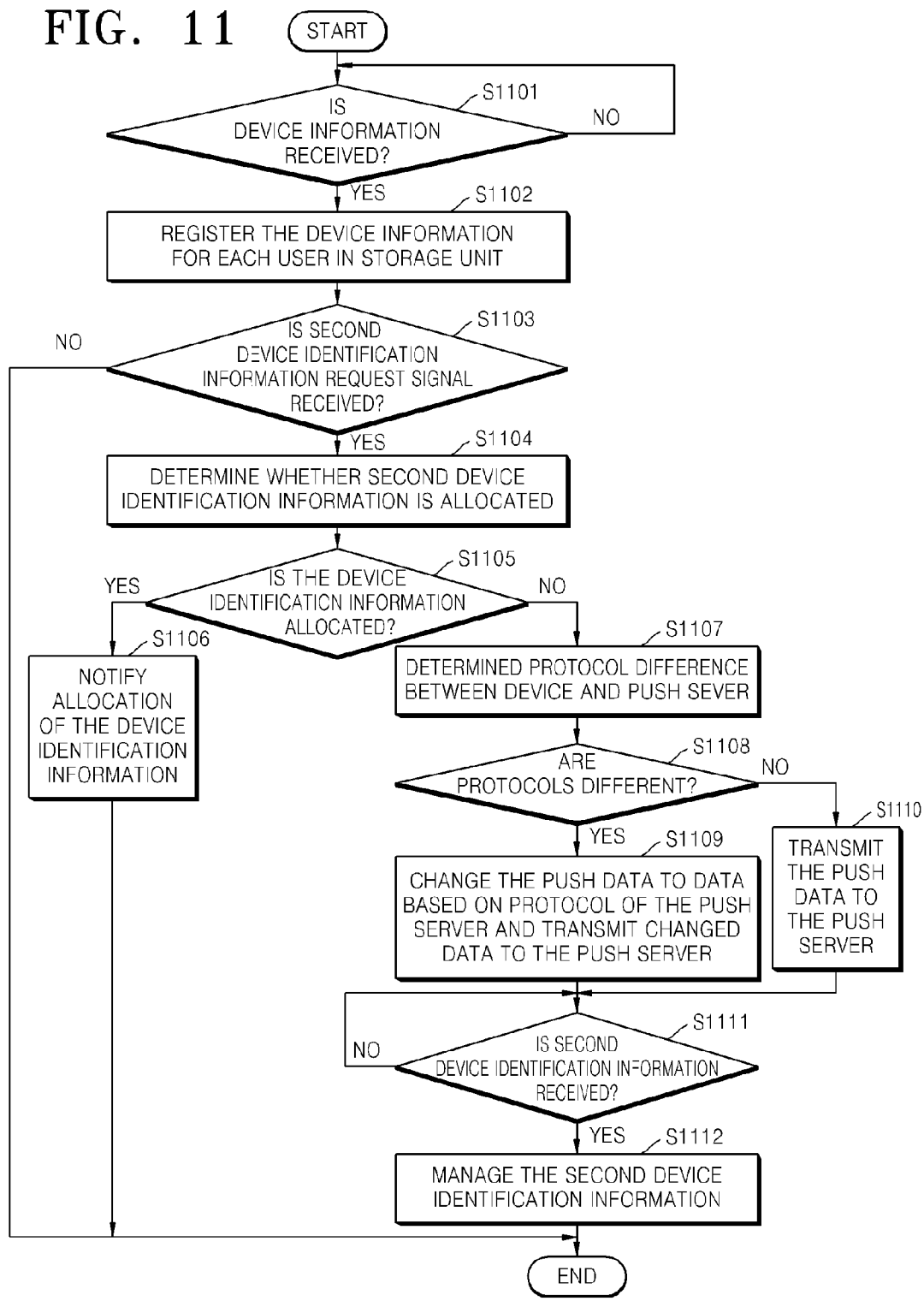
FIG. 11 is a flowchart illustrating operations of registering information relating to a user device and allocating second device identification information in methods for brokering a communication connection between a device and a push server according to one or more exemplary embodiments.

FIG. 11 is a flowchart illustrating operations of registering information relating to a user device connected to the brokering apparatus 130 and allocating second device identification information in the push server 120 in methods for brokering a communication connection between a device and the push server 120 according to one or more exemplary embodiments. The flowchart of FIG. 11 may be added after a connection to the device is authenticated in one or more exemplary embodiments.

Referring to FIG. 11, if the processor 240 receives device information including first device identification information and application identification information from one or more devices connected to the brokering apparatus 130 (operation S1101), the processor 240 registers the received device information and stores the registered device information in the storage unit 230 for each user as listed in Table 3 above (operation S1102). If the processor 240 receives second device identification information from one or more of the devices connected to the brokering apparatus 130 (operation S1103), the processor 240 determines whether the second device identification information is allocated to a user of a device that requests the second device identification information by using information stored in the storage unit 230 (operation S1104), and by using user information stored in the storage unit 230. The user information includes the second device identification information for each user.

If processor 240 determines that the second device identification information is allocated to the user, the processor 240 notifies the device that requests the second device identification information that the second device identification information is allocated to the user (operations S1105 and S1106), and ends operations. If processor 240 determines that the second device identification information is not allocated to the user, the processor 240 determines whether respective protocols of the push server 120 and a device that transmits a second device identification information request signal differ (operations S1105 and S1107).

If the processor 240 determines that the respective protocols of the push server 120 and the device that transmits the second device identification information request signal differ, the processor 240 modifies the second device identification information request signal based on the protocol of the push server 120, and transmits the modified data to the push server 120 via the second communication unit 220 (operations S1108 and S1109). If the processor 240 determines that the respective protocols of the push server 120 and the device that transmits the second device identification information request signal do not differ, the processor 240 does not modify the second device identification information request signal, and transmits the second device identification information request signal to the push server 120 (operations S1108 and S1110).

If the processor 240 receives the second device identification information from the push server 120, the processor 240 manages the received second device identification information (operations S1111 and S1112), by storing the second device identification information together with the user information stored in the storage unit 230 and transmitting the second device identification information to the device that requests the second device identification information, or by storing the second device identification information together with the user information stored in the storage unit 230 and transmitting the second device identification information to a corresponding application server from among the first through nth application servers 110_1~110_n via the third communication unit 250 as described with respect to the brokering apparatus 130 of FIG. 1. The corresponding application server may be determined based on the application identification information registered in operation S1102. For example, if the application identification information registered in operation S1102 is identification information relating to the first application server 110_1, the second device identification information and the application identification information are transmitted to the first application server 110_1.

Figure 12:
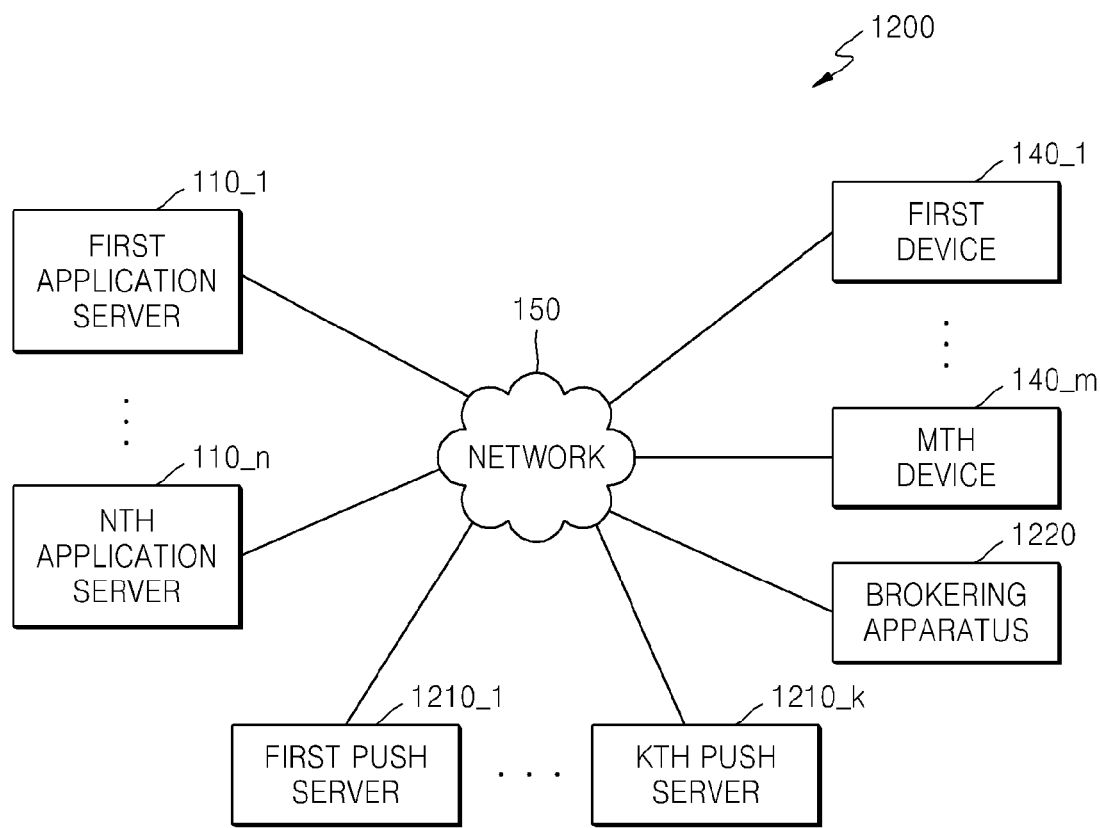
FIG. 12 is a block diagram of a push service system according to another exemplary embodiment.

FIG. 12 is a block diagram of a push service system 1200 according to another exemplary embodiment. In FIG. 12, a plurality of push servers that perform communication by using respective protocols embedded in different platforms are added to the push service system of FIG. 1. Thus, an application developer may develop an application based on a protocol of a second push server 1210_2 from among first through kth push servers 1210_1~1210_k, and then provide a device that communicates by using a protocol embedded in a platform which is different from the protocol of the second push server 1210_2 with push data via the second push server 1210_2. Accordingly, the push service system may provide devices that communicate based on protocols embedded in various platforms without changing an architecture of a push server, an application server, a brokering apparatus 1200, and a device for the push service.

Figure 13:
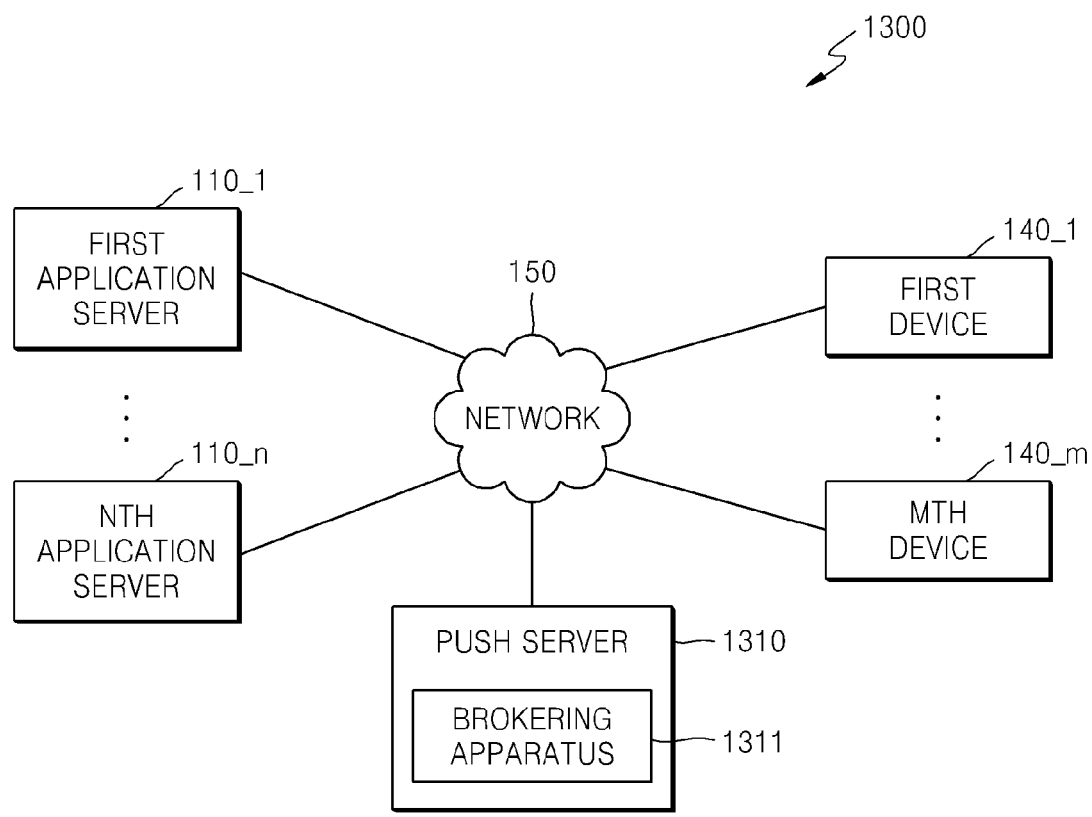
FIG. 13 is a block diagram of a push service system according to another exemplary embodiment.

FIG. 13 is a block diagram of a push service system 1300 according to another exemplary embodiment. In FIG. 13, a brokering apparatus 1311 is embedded in a push server 1310. In this case, the second communication unit 220 of FIG. 2 may be configured as an interface for transmitting and receiving data between the brokering apparatus 1311 and a processor residing in the push server 1310.

Figure 14:
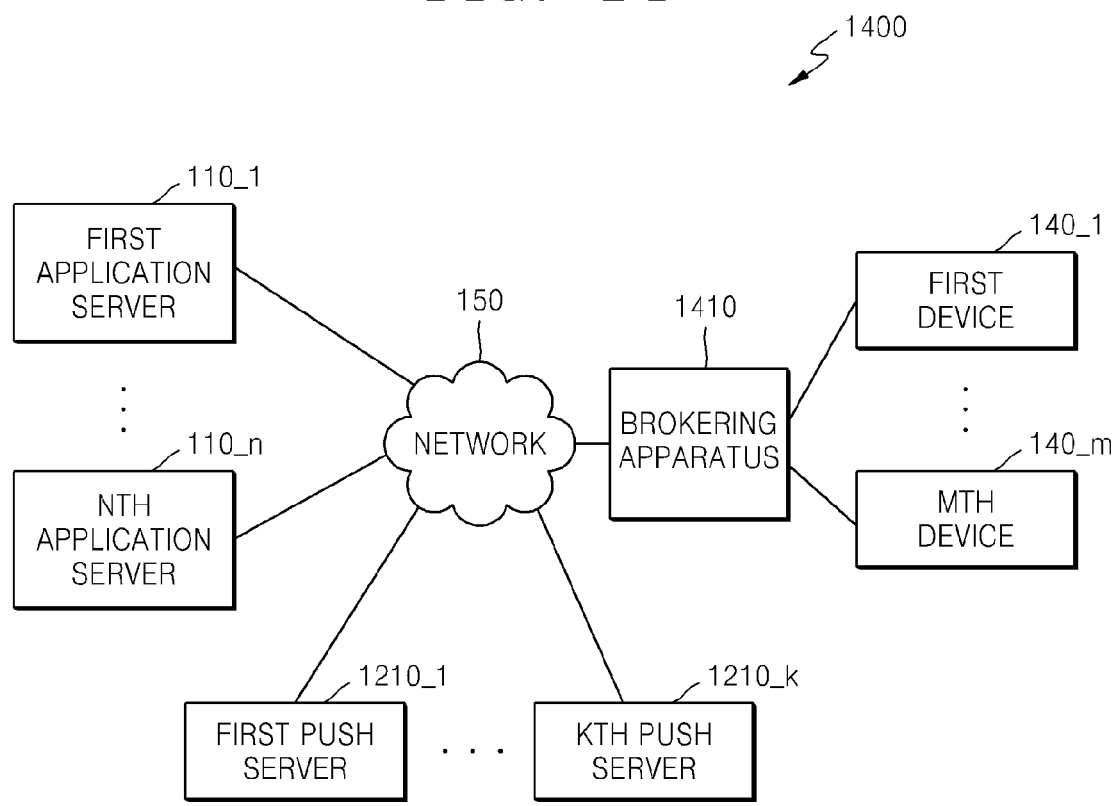
FIG. 14 is a block diagram of a push service system according to another exemplary embodiment.

FIG. 14 is a block diagram of a push service system 1400 according to another exemplary embodiment. In FIG. 14, a brokering apparatus 1410 is connected to each of the first through mth devices 140_1~140_m.

FIG. 15 is a block diagram which illustrates a flow of push data when a push service is provided by using a brokering apparatus 1506 as used in a push service system 1500 according to one or more exemplary embodiments.

Referring to FIG. 15, a user transmits the push data to an application server 1502 by using a transmission device 1501. The push data outputted from the transmission device 1501 includes second device identification information relating to the transmission device 1501, application identification information, and second device identification information relating to each of first, second, and third reception devices 1507~1509.

The application server 1502 transmits the push data to each of first, second, and third push servers 1503~1505 that communicate by using a protocol embedded in the same platform. In FIG. 15, the application server 1502 transmits the push data to the second push server 1504. This means that if an application of the application server 1502 is based on a protocol embedded in a BADA platform, the second push server 1504 is also based on the protocol embedded in the BADA platform.

The second push server 1504 analyzes the received push data and detects the second device identification information relating to each of first, second, and third reception devices 1507~1509. The second push server 1504 transmits the push data to the brokering apparatus 1506 by using the detected second device identification information. This means that the brokering apparatus 1506 manages the second device identification information detected by the second push server 1504.

The brokering apparatus 1506 transmits the push data to at least one of the first, second, and third reception devices 1507~1509 based on the second device identification information included in the received push data (1510). Transmission of the push data from the brokering apparatus 1506 to each respective one of the first, second, and third reception devices 1507~1509 is performed similarly as described with respect to the exemplary embodiments above.

The method and/or apparatus described above with respect to one or more exemplary embodiments can also be embodied as computer readable codes stored on a computer readable recording medium. The computer readable recording medium may include any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over one or more network-coupled computer systems such that the computer readable code is stored and executed in a distributed fashion.

While the present inventive concept has been particularly shown and described with reference to exemplary embodiments thereof, it will be understood by those of ordinary skill in the art that various changes in form and details may be made therein without departing from the spirit and scope of the present disclosure as defined by the appended claims. The exemplary embodiments should be considered in a descriptive sense only and not for purposes of limitation. Therefore, the scope of the present inventive concept is defined not by the detailed description of the exemplary embodiments but by the appended claims, and all differences within the scope will be construed as being included in the present disclosure.

What is claimed is:

1. A method for brokering a communication connection between at least one device and a server, the method comprising:
    authenticating a connection between the at least one device and a brokering device based on protocol information relating to the at least one device;
    connecting the at least one device and the brokering device based on a result of the authenticating;
    if the brokering device receives data from the server, determining a target device among the at least one device connected to the brokering device based on the data;
    determining, based on the protocol information relating to the target device, whether a protocol relating to the server is different from a protocol of the target device; and
    in response to a determination being made that the protocol relating to the server is different from the protocol of the target device, modifying, by the brokering device, the data based on the protocol of the target device and transmitting the modified data to the target device.

2. The method of claim 1, further comprising:
    receiving, by the brokering device, a selection signal which indicates at least one user device of a plurality of user devices connected to the brokering device from the at least one device; and
    setting, by the brokering device, at least one target user device based on the received selection signal,
    wherein the modifying of the data and the transmitting of the modified data to the target device comprise: modifying the data received from the server based on a protocol relating to the at least one target user device and transmitting the modified data to the at least one target user device.

3. The method of claim 2, further comprising: registering first device identification information received from the at least one device for which the connection to the brokering device is authenticated and application identification information in the brokering device.

4. The method of claim 3, wherein the registering of the first device identification information and the application identification information is performed for each user,
    wherein the at least one user device indicated by the selection signal relates to the first device identification information and the application identification information registered in the brokering device for each user.

5. The method of claim 3, further comprising:
    if a request signal which includes second device identification information is received from the at least one device, modifying, by the brokering apparatus, the second device identification information based on a protocol relating to the server and transmitting, by the brokering device, the modified data to the server; and
    if second device identification information allocated to the at least one device is received from the server, managing, by the brokering device, the received second device identification information.

6. The method of claim 5, wherein the managing of the received second device identification information comprises: storing the received second device identification information in the brokering device, modifying the received second device identification information based on the protocol relating to the at least one device, and transmitting the modified data to the at least one device.

7. The method of claim 5, wherein the managing of the second device identification information comprises: storing the received second device identification information in the brokering device, and transmitting the received second device identification information to an application server relating to the application identification information.

8. A brokering device for brokering a communication connection between at least one device and a server, the brokering device comprising:
- a first communication unit configured to communicate with the at least one device;
- a second communication unit configured to communicate with the server and to receive data transmitted from the server; and
- a processor configured to authenticate a connection with the at least one device via the first communication unit based on protocol information relating to the at least one device, to connect the at least one device and the brokering device based on a result of the authenticating, to determine a target device among the at least one device connected to the brokering device based on the data, and to determine, based on the protocol information relating to the target device, whether a protocol relating to the server is different from a protocol of the target device,
- wherein in a determination being made that the protocol relating to the server is different from the protocol of the target device, the processor modifies the data based on the protocol of the target device and transmits, via the first communication unit, the modified data to the target device.

9. The brokering device of claim 8, wherein, if a selection signal which indicates at least one user device of a plurality of user devices connected to the first communication unit is received from the at least one device, the processor sets at least one target user device based on the received selection signal, and
- if the data is received from the server via the second communication unit, the processor modifies the received data based on a protocol relating to the at least one target user device and transmits the modified data to the at least one target user device via the first communication unit.

10. The brokering device of claim 8, further comprising: a storage unit configured to store at least one quantum of protocol information,
- wherein the processor registers first device identification information received from the at least one device for which the connection via the first communication unit is authenticated and application identification information, and stores the registered information in the storage unit.

11. The brokering device of claim 10, wherein the processor registers the first device identification information and the application identification information for each user, and stores the registered information in the storage unit.

12. The brokering device of claim 10, wherein, if a request signal which includes second device identification information is received from the at least one device, the processor modifies the received second device identification information based on a protocol relating to the server and transmits the modified data to the server via the second communication unit; and
- if second device identification information is received from the server via the second communication unit, the processor manages the received second device identification information.

13. The brokering device of claim 12, wherein the processor manages the received second device identification information by storing the received second device identification information in the storage unit, modifying the second device identification information based on the protocol relating to the at least one device, and transmitting the modified data to the at least one device via the first communication unit.

14. The brokering device of claim 13, further comprising: a third communication unit configured to communicate with an application server,
- wherein the processor manages the received second device identification information by storing the received second device identification information in the storage unit, and transmitting the received second device identification information to the application server via the third communication unit.

15. The brokering device of claim 10, wherein the brokering device is embedded in the server, and the second communication unit is configured as an interface for transmitting and receiving data between the server and the brokering device.

16. A push service system comprising:
- at least one device which receives push data;
- an application server which provides the push data based on at least one application;
- a push server which transmits the push data provided from the application server to the at least one device based on identification information allocated to the at least one device; and
- a brokering device which brokers a communication connection between the at least one device and the push server by intercepting the transmitted push data, determining a target device among the at least one device connected to the brokering device, and determining, based on protocol information relating to the target device, whether a protocol relating to the push server is different from a protocol of the target device, and in response to a determination being made that the protocol relating to the server is different from the protocol of the target device, causes the push data to be transmitted from the push server to the target device irrespective of a protocol difference between the target device and the push server.

17. The system of claim 16, wherein the brokering device modifies the push data based on the protocol of the target device.

18. A non-transitory computer readable storage medium comprising a program which, when executed by a computer, performs operations of:
- causing a brokering device to authenticate a communication connection between at least one device and the brokering device based on protocol information relating to the at least one device, to connect the at least one device and the brokering device based on a result of the authenticating, to determine a target device among the at least one device connected to the brokering device based on data, when the data is received from the server, and to determine, based on the protocol information relating to the target device, whether a protocol relating to the server from which the data is being directed to the target device is different from a protocol of the target device; and
- in response to a determination being made that the protocol relating to the server is different from the protocol of the target device, causing the brokering device to modify the data based on the protocol of the target device, and causing the brokering device to transmit the modified data to the target device.

19. The non-transitory computer readable storage medium of claim 18, wherein the program, when executed by the computer, further performs an operation of:

causing the brokering device to use a selection signal, which is received from the at least one device and which indicates at least one user device which is connected to the brokering device, for setting at least one target user device based on the received selection signal, wherein the modifying of the data comprises modifying the data received from the server based on a protocol relating to the at least one target user device, and wherein the transmitting of the modified data comprises transmitting the modified data to the at least one target user device.

20. The non-transitory computer readable storage medium of claim 18, wherein the program, when executed by the computer, further performs an operation of causing the brokering device to register application identification information and first device identification information relating to the at least one device.

* * * * *